May 12, 1953 — W. A. CLARK — 2,638,153
SPRING STRUCTURE
Filed June 29, 1951 — 2 Sheets-Sheet 1
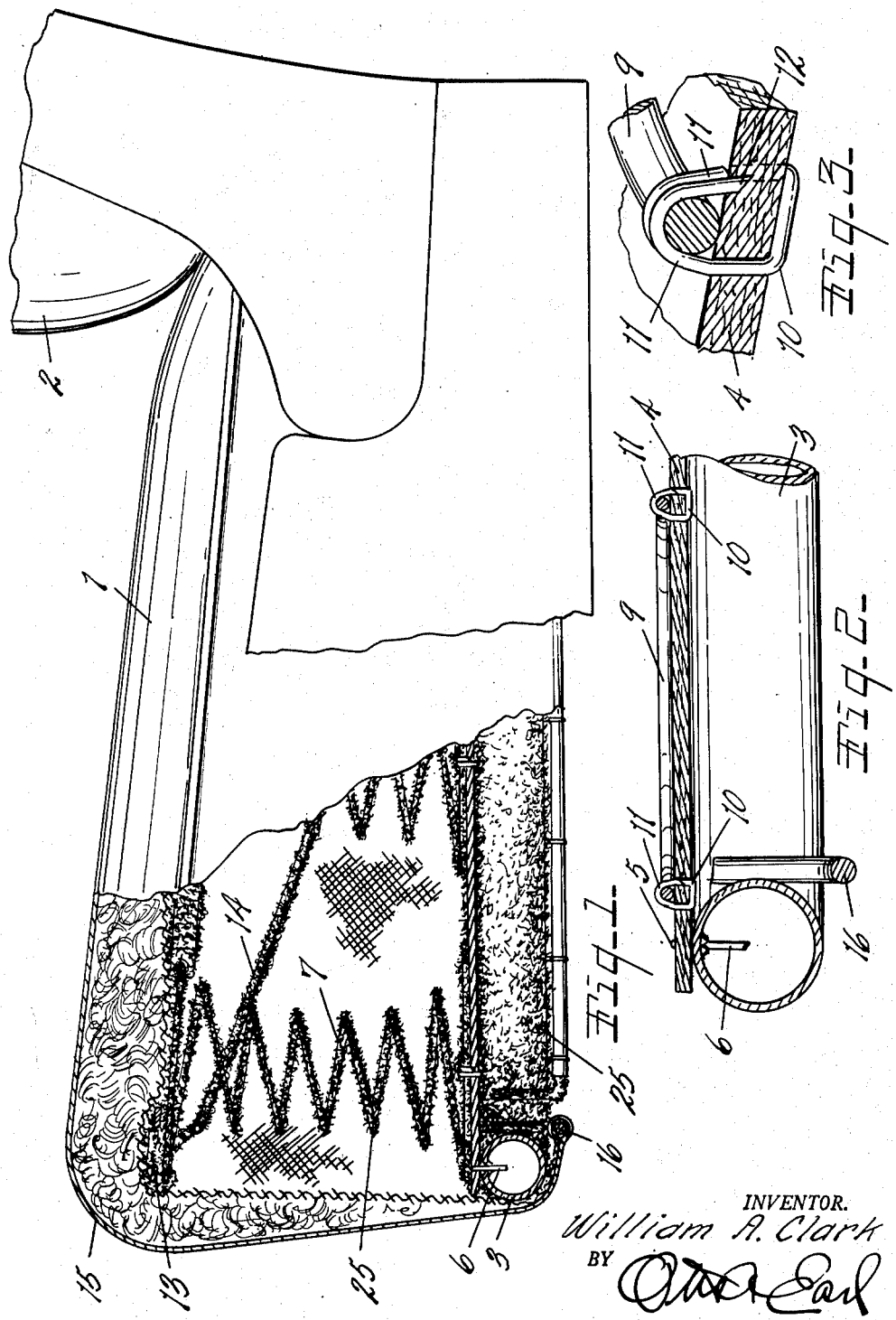
INVENTOR.
William A. Clark
BY Otto Earl
Attorney May 12, 1953 W. A. CLARK 2,638,153
SPRING STRUCTURE
Filed June 29, 1951 2 Sheets-Sheet 2

INVENTOR.
William A. Clark
BY
Otto A. Earl
Attorney

Patented May 12, 1953

2,638,153

UNITED STATES PATENT OFFICE 2,638,153

SPRING STRUCTURE

William A. Clark, Detroit, Mich.

Application June 29, 1951, Serial No. 234,330

6 Claims. (Cl. 155—179)

This invention relates to improvements in spring structures.

The main objects of this invention are:

First, to provide a spring structure which is well adapted for use in automobile seat cushions and backs and also in furniture, which may be economically produced, is attractive in appearance and noiseless in use.

Second, to provide a spring unit comprising a frame, supporting panel and springs mounted thereon in which the springs are very effectively supported, the structure being very strong and rigid in proportion to the weight of the material used and providing a finished appearance.

Third, to provide in a spring structure of the class above indicated an improved spring mounting unit.

Objects relating to details and economies of the invention will appear from the description to follow. The invention is pointed out in the claims.

A preferred embodiment of the invention is illustrated in the accompanying drawings, in which:

Fig. 1 is a fragmentary end elevational view of a motor vehicle seat structure embodying my invention, partially in vertical section from front to rear with certain of the parts being shown conventionally.

Fig. 2 is a fragmentary view partially in vertical section illustrating structural details.

Fig. 3 is an enlarged fragmentary perspective view illustrating further details of the spring support and the attachment of the springs thereto.

Figure 5:
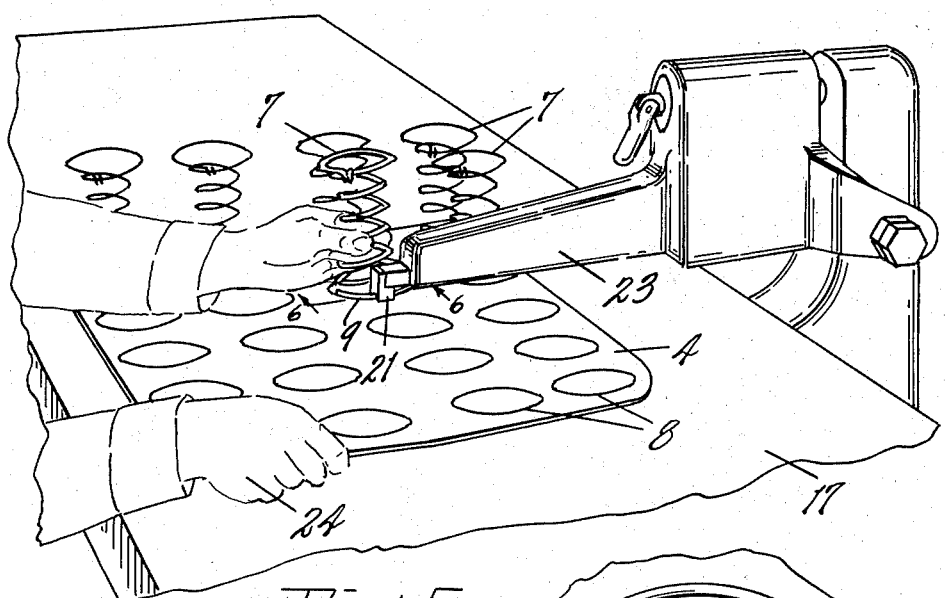
Fig. 5 is a fragmentary perspective view of the machine or apparatus for use in the mounting of the springs on the supporting panel, parts being shown conventionally and the location of the springs upon the supporting panel being indicated by circles.
Figure 7:
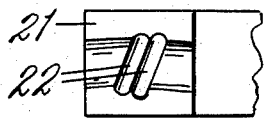
Fig. 7 is a fragmentary inverted view of the staple clinching anvil.

The embodiment of my invention illustrated is an automobile seat comprising a cushion 1 and back 2. It will be understood that my spring structure is used both in seat cushions and backs for motor vehicles and is also well adapted for use in furniture seats and backs. In the embodiment illustrated the base frame 3 is formed of tubing. The spring supporting panel 4 is of rigid non-metallic material, Masonite or similar fibreboard being desirable for the purpose.

The panel 4 is secured to the frame 3 by means of fasteners 5 driven through the panel and into the frame with the prongs or ends 6 thereof within the frame. The helically coiled springs 7 are mounted upon the panel in suitable spaced relation, the positioning of the springs upon the panel being indicated by the circles 8 thereon. The bottom coils 9 of the springs rest directly upon the panel and are fixedly secured thereto by staples 10 which are driven through the panel from the underside thereof with their prongs 11 straddling the bottom coils of the springs and clamped therearound as is clearly shown in Figs. 2 and 3 with the prongs in side by side relation and the tips 12 of the prongs imbedded in the panel.

Figure 4:
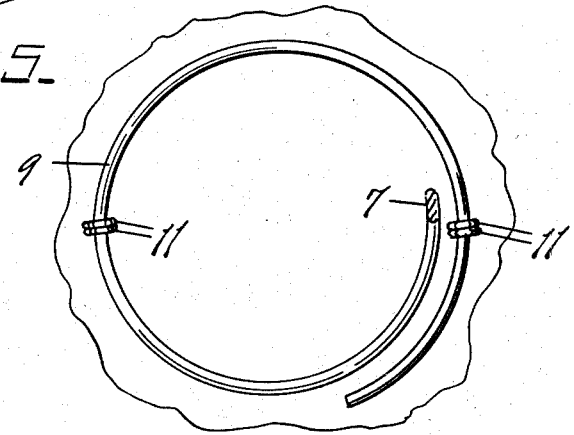
Fig. 4 is a fragmentary horizontal section further illustrating the details of the spring mounting.
Figure 6:
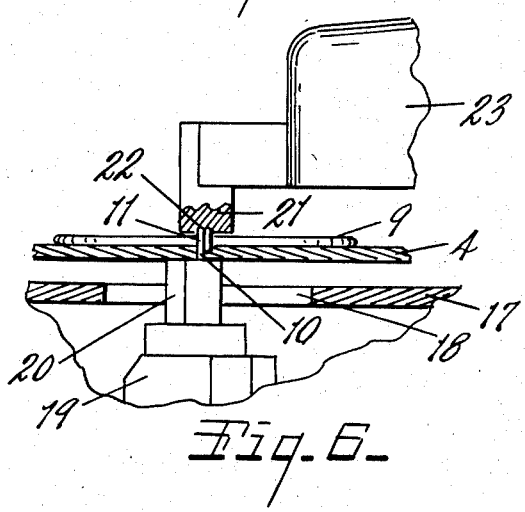
Fig. 6 is an enlarged fragmentary view partially in section on a line corresponding to line 6—6 of Fig. 5 showing further details of an apparatus or machine shown in Fig. 5.

The prongs of the staples are wrapped around the bottom coils at an angle to the normal which affords a very effective clamping engagement. At least two staples for each spring are desirable and two are effective for most purposes. The staples are angularly spaced relative to each other and preferably diametrically opposite, with one of the staples adjacent the end of the bottom coil as is shown in Fig. 4.

The top rim 13 and the braces 14 form no part of my present invention nor does the upholstery, designated generally by the numeral 15. The base frame is desirably provided with upholstery attaching rods 16 to which the upholstery is secured as indicated in Fig. 1.

The spring assembly is coated with a coating comprising an adhesive and a surfacing of flock retainingly secured by the adhesive. That is described in detail in my application for Patent Serial No. 212,412, filed February 23, 1951. This coating, however, is a highly desirable feature as embodied in my present invention as it provides a structure in which all exposed parts are thoroughly protected and provided with a relatively soft surface to receive the upholstery and the structure is rendered noiseless and protected against corrosion without enameling or other treatment.

In Fig. 5 I have illustrated an apparatus which I found satisfactory in the production of the spring units of my invention. This comprises a table 17 having an opening 18 therein above the stapler head 19 and 20 conventionally illustrates the staple driving element but as the details form no part of this invention they are not described herein. However, the anvil 21 having the prong guiding grooves 22 therein is of importance in that it insures that the prongs clampingly engage the bottom coils of the springs as is illustrated and that the prongs embrace the coils in a very effective manner and the tips of the prongs are embedded in the panel.

The anvil is carried by an arm 23 spaced from the table so that the panel 4 may be manipulated below the arm and above the table. The operator, indicated at 24, positions the spring with one hand and manipulates the panel with the other hand as is indicated. The positioning of the panel and the spring relative to the anvil insures that the staples are driven in proper position.

The completed assembly is provided with a coating, as stated, the coating being indicated at 25 and consisting of the adhesive with a surfacing of flock retainingly secured by the adhesive. The entire spring assembly is dipped or has adhesive applied thereto and flock or other suitable filament fibrous material is applied by a spray gun or the like.

I have illustrated and described my invention in a highly practical embodiment thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. In a spring structure, the combination of a tubular frame, a spring supporting panel of rigid nonmetallic material fixedly secured to the frame, helically coiled body springs disposed with their bottom coils resting on said panel, and staples driven through said panel from the underside thereof with their prongs straddling and clampingly wrapped in opposite directions and in side by side relation upon the bottom coils of the springs to clampingly secure the coils to the panel, the tips of the prongs being imbedded in the panel, there being a pair of diametrically opposed staples for each spring.

2. In a spring structure, the combination of a frame, a spring supporting panel fixedly secured to the frame by fasteners penetrating the frame and retainingly engaged therewith with their tips within the frame, helically coiled body springs disposed with their bottom coils resting on said panel, and staples driven through said panel from the underside thereof with their prongs straddling and wrapped in opposite directions upon the bottom coils of the springs with the tips of the prongs imbedded in the panel, there being a plurality of angularly spaced staples for each spring.

3. In a spring structure, the combination of a spring supporting panel, helically coiled body springs disposed with their bottom coils resting on said panel, and staples driven through said panel from the underside thereof with their prongs straddling and clampingly wrapped in opposite directions and in side by side relation and at an angle to the normal upon the bottom coils of the springs with the tips of the prongs imbedded in the panel, there being a plurality of angularly spaced staples for each spring.

4. A spring structure comprising the combination of a spring supporting panel, a plurality of helically coiled body springs disposed with their bottom coils upon said panel, and staples driven through said panel from the underside thereof with their prongs straddling the bottom coils and clamped in opposed relation upon the same with the tips of the prongs imbedded in the panel, there being at least two staples for each spring disposed in angularly spaced relation with one of the staples disposed adjacent the end of the coil.

5. A spring structure comprising the combination of a spring supporting panel, a plurality of helically coiled body springs disposed with their bottom coils upon said panel, and staples driven through said panel from the underside thereof with their prongs straddling the bottom coils and clamped in opposed relation upon the same with the tips of the prongs imbedded in the panel.

6. A spring structure comprising the combination of a spring supporting panel, a plurality of helically coiled body springs disposed with their bottom coils upon said panel, and staples driven through said panel from the underside thereof with their prongs straddling the bottom coils and clamped in opposed relation upon the same, there being at least two staples for each spring disposed in angularly spaced relation with one of the staples disposed adjacent the end of the coil.

WILLIAM A. CLARK.

References Cited in the file of this patent

UNITED STATES PATENTS

| Number | Name | Date |
|---|---|---|
| 1,270,841 | Kelly | July 2, 1918 |
| 2,257,994 | Zofnass | Oct. 7, 1941 |
| 2,265,532 | Levine | Dec. 9, 1941 |
| 2,273,064 | Owen | Feb. 17, 1942 |